United States Patent [19]

Hibi

[11] Patent Number: 5,481,310

[45] Date of Patent: Jan. 2, 1996

[54] IMAGE ENCODING APPARATUS

[75] Inventor: Keiichi Hibi, Kashiwa, Japan

[73] Assignee: Sharp Kabushiki Kaisha, Japan

[21] Appl. No.: 232,356

[22] Filed: Apr. 22, 1994

Related U.S. Application Data

[63] Continuation of Ser. No. 928,400, Aug. 13, 1992, abandoned.

[30] Foreign Application Priority Data

Aug. 29, 1991 [JP] Japan .................................. 3-218805

[51] Int. Cl.$^6$ ................................ H04N 7/24; H04N 7/32
[52] U.S. Cl. ........................... 348/413; 348/699; 348/416
[58] Field of Search ............................... 348/409, 410, 348/411, 412, 413, 415, 416, 699, 400, 401, 402, 407; H04N 7/13, 7/137

[56] References Cited

U.S. PATENT DOCUMENTS

| | | | |
|---|---|---|---|
| 4,546,386 | 10/1985 | Matsumoto et al. | 358/105 |
| 4,816,906 | 3/1989 | Kummerfeldt et al. | 348/402 |
| 4,827,340 | 5/1989 | Pirsch | 358/133 |
| 4,972,261 | 10/1990 | Whalley | 358/133 |
| 4,999,705 | 3/1991 | Puri | 348/412 |
| 5,068,724 | 11/1991 | Krause et al. | 348/402 |
| 5,072,293 | 12/1991 | De Haan et al. | 358/105 |
| 5,093,720 | 3/1992 | Krause et al. | 358/133 |
| 5,155,593 | 10/1992 | Yonemitsu et al. | 348/413 |
| 5,191,414 | 3/1993 | Sugiyama | 348/415 |
| 5,235,419 | 8/1993 | Krause | 358/135 |
| 5,243,420 | 9/1993 | Hibi | 348/409 |

FOREIGN PATENT DOCUMENTS

| | | | |
|---|---|---|---|
| 0395440A2 | 10/1990 | European Pat. Off. | H04N 7/137 |
| 0397206A3 | 11/1990 | European Pat. Off. | H04N 7/137 |
| 0420627A2 | 4/1991 | European Pat. Off. | H04N 7/13 |
| 0424026A2 | 4/1991 | European Pat. Off. | H04N 7/137 |
| 0526163A2 | 2/1993 | European Pat. Off. | H04N 7/13 |

OTHER PUBLICATIONS

"An Improvement of Prediction Efficiency Using Multiple Inter–Frame Correlations," pp. 267–270, *Proc. in Picture coding Symposium of Japan, 1991* by Hibi et al (no translation available).

"A Study of Reducing Predictor Error for Inter Frame Coding," pp. 257–258. Proc. in Picture coding Symposium of Japan, 1991, by Nagata et al (no translation available).

*Primary Examiner*—Howard W. Britton
*Assistant Examiner*—Vu Le
*Attorney, Agent, or Firm*—Nixon & Vanderhye

[57] ABSTRACT

An image encoding apparatus which enables to improve an efficiency of a motion compensate encoding includes a frame memory unit (12) for storing a preceding encoded and partially decoded image signal, a first and a second motion compensated prediction units (11,14) connected to the frame memory unit (12) for predicting a motion compensation between predetermined image signals and the image signal stored in the frame memory unit (12), and a predicted value selection unit (15) connected to the first and second motion compensated prediction units (11,14) for comparing a first prediction value outputted from the first motion compensated prediction unit (11) with a second prediction value outputted from the second motion compensated prediction unit (14) and for selecting the first prediction value or the second prediction value in accordance with a compared result.

5 Claims, 4 Drawing Sheets

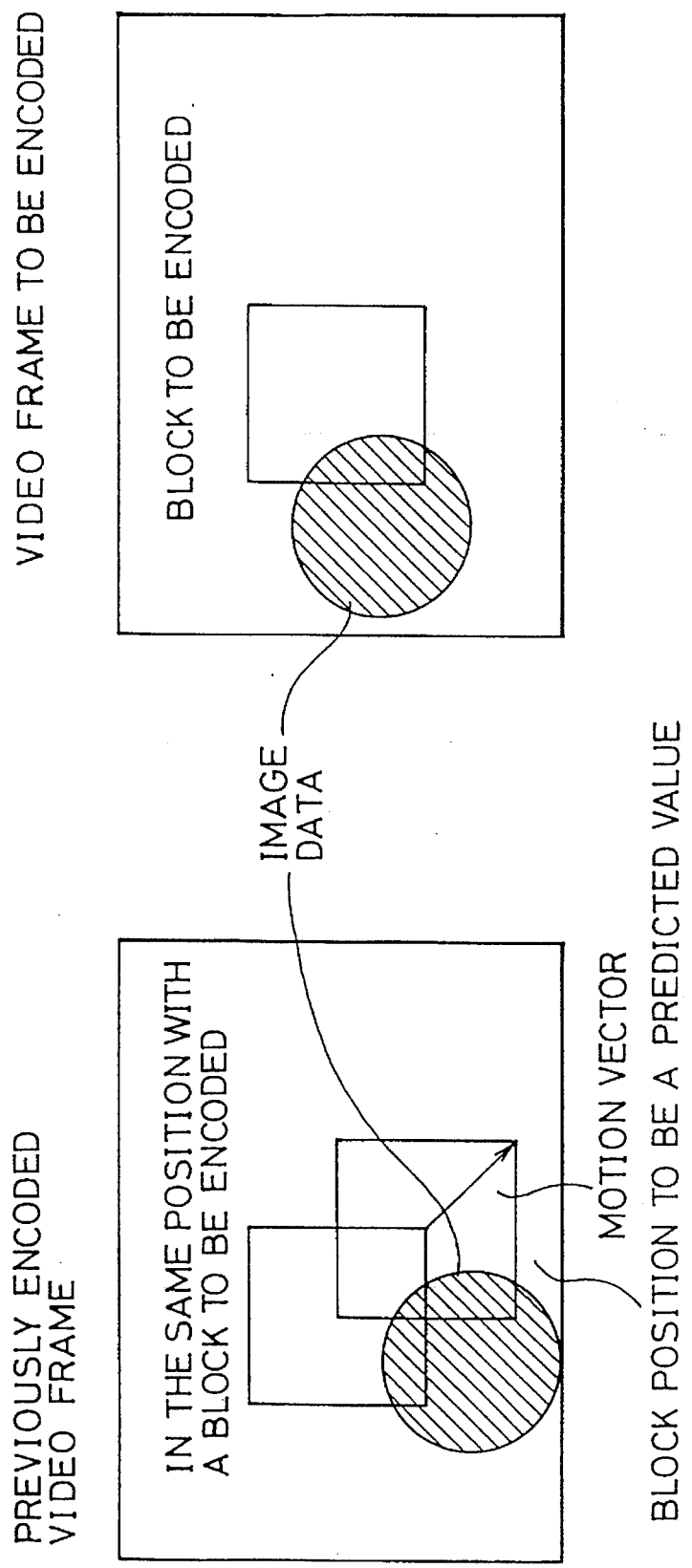

IMAGE ENCODING APPARATUS

This is a continuation of application Ser. No. 07/928,400, filed Aug. 13, 1992, now abandoned.

BACKGROUND OF THE INVENTION

1. Field of the Invention

The present invention relates to an image encoding apparatus for encoding information contained in a video (time-varying image) so as to reduce an amount of information contained in the video signal.

2. Description of the Related Art

Recently, with developments of high-speed digital signal processing and large scale integration (LSI) techniques therefor, with the progress of image processing techniques, making efficient use of image information is expected. In particular, in the field of communication, active studies are conducted for a high-functional network enabling which transmits image information efficiently. For B-ISDN (Broadband-Integrated Services Digital Network), which is a wide-band communication network of the next generation, it is expected that very high quality image transmission service will be realized supplied.

In general, it is unpractical to process a video signal as it is, since too much information is contained in an image information is too much. However, since much redundancy is involved in its information the amount of information can be reduced by removing the redundancy. Because of this, a video compression encoding technique is very important for efficiently processing the video information, and active studies are conducted concerning a video encoding system therefor.

A video signal comprises temporal information about movement, change, etc. and spatial information about the contents of a piece of video frame, both of which include redundancy. The amount of information can be greatly reduced by reducing time redundancy since successive video frames have much correlation, particularly in a video (time-varying) signal. A motion compensated interframe prediction encoding system is widely used: in general as an encoding system by means of such time correlation.

An example of a known image encoding apparatus is described below.

An inputted video signal is sent to a motion compensated predictor in non-duplicate rectangular blocks by each video frame. The motion compensated predictor effects a motion compensated prediction between the inputted video signal and a video signal inputted prior to the inputted video signal and stored in the frame memory to detect and output a motion vector.

A block judged to be the most appropriate is read out as a predicted value from the frame memory, resulting from the above motion compensated prediction.

A difference operator obtains the difference between the predicted value and the inputted image signal to output a prediction error signal which is sent to an error encoder. The error encoder effects appropriate encoding such as DCT (Discrete Cosline Transform) encoding by means of a correlation of a prediction error signal inside a video frame, resulting in an encoded signal to be outputted to the outside of the device together with a motion vector from the motion compensated predictor.

On the other hand, the encoding signal is locally decoded in the error decoder to output a prediction error decoding signal which is added at the adder again to a predicted value read out from the frame memory to obtain a video signal reproduced after encoded.

This reproduced video signal is sent to and stored in the frame memory. Upon a completion of encoding a video frame, the frame memory stores a locally decoded and reproduced video signal of the video frame which is used as a predicted value of motion compensated prediction of the following video frame to be encoded.

However, in the above-mentioned known image encoding apparatus in which encoded video frames are used one after another for a prediction encoding of the following video frames, an interframe prediction may be prevented by strong correlation between information involved in a video frame to be subsequently encoded and information involved in the following video frame to be encoded, resulting in a problem of uncertainty about the effects of motion compensated prediction encoding.

SUMMARY OF THE INVENTION

It is therefore an object of the present invention to provide an image encoding apparatus which enables to improve an efficiency of the motion compensate encoding by separating information strongly correlated with the following image frame and using it for a prediction of the following image frame at a time when the video frame is encoded by the motion compensation prediction encoding.

The object of the present invention can be achieved by an image encoding apparatus which enables to improve an efficiency of a motion compensate encoding includes a unit for storing a preceding encoded and partially decoded image signal, a unit connected to the storing unit for predicting a motion compensation between predetermined image signals and the image signal stored in the storing unit, and a unit connected to the prediction unit for comparing a first prediction value outputted from the prediction unit with a second prediction value outputted from the prediction unit and for selecting the first prediction value or the second prediction value in accordance with a compared result.

Preferably, the image encoding apparatus further includes a unit for delaying the inputted image signal.

More preferably, the predicting unit includes a first prediction unit connected to the storing unit for predicting a motion compensation between an inputted image signal and the image signal stored in the storing unit.

The predicting unit preferably further includes a second prediction unit connected to the delaying unit for predicting a motion compensation between the image signal delayed by the delaying unit and the image signal stored in the storing unit.

The image signal is a time-varying image signal, preferably.

The image signal is a video signal, preferably.

The object of the present invention also can be achieved by an image encoding apparatus which enables to improve an efficiency of a motion compensate encoding includes a frame memory unit for storing a preceding encoded and partially decoded video signal, a first motion compensated prediction unit connected to the frame memory unit for predicting a motion compensation between an inputted video signal and the video signal stored in the frame memory unit, a delaying unit for delaying the inputted video signal, a second motion compensated prediction unit connected to the delaying unit for predicting a motion compensation between the video signal delayed by the delaying unit and the video signal stored in the frame memory unit, and a predicted value selection unit connected to both the first motion compensated prediction unit and the second motion compensated prediction unit for comparing a prediction value outputted from the first motion compensated prediction unit with a prediction value outputted from the second motion compensated prediction unit and for selecting one of the prediction values in accordance with a compared result.

Preferably, the predicted value selection unit compares a predicted signal outputted from the first motion compensated prediction unit and a predicted signal outputted from the second motion compensated prediction unit for an appropriate selection so as to output two types of prediction error signals.

More preferably, the image encoding apparatus further includes an error encoding unit connected to the predicted value selection unit for appropriately encoding the prediction error signals so as to output encoded signals corresponding to the prediction error signals, respectively.

The image encoding apparatus further preferably includes an error unit for partially decoding one type of the encoded signals so as to output a prediction error decoded signal.

The image encoding apparatus further includes an adding unit connected to both the predicted value selection unit and the error decoding unit for adding the prediction error decoded signal to the predicted value so as to output a reproduced video signal after encoded, preferably.

The video signal is preferably a time varying image signal.

In operation, the first motion compensated predicting means performs a motion compensated prediction between a video frame to be encoded and an appropriate video frame several frames ahead therefrom, the second motion compensated predicting means performs a motion compensated prediction between adjacent video frames, the predicted value selecting means compares the results of prediction by the above two motion compensated predicting means to obtain a correlation with a video frame ahead, separating and outputting information available for a prediction of the following video frame to enable a good efficiency of the motion compensated prediction.

As explained above, the image encoding apparatus of the present invention uses only information strongly correlated with the following video frame, separated from information contained in a video frame to be encoded, enabling better efficiency in encoding, resulting in better quality of encoded video in a system relating to video information. In addition, it enables also very good effects in a motion compensated prediction encoding in a high quality video encoder expected to be realized, resulting in great improvement in encoding efficiency, with application of the present invention.

BRIEF DESCRIPTION OF THE DRAWINGS

FIG. 4 is an explanatory drawing to explain the principle of a motion compensated prediction encoding system.

DESCRIPTION OF THE PREFERRED EMBODIMENTS

Referring to the accompanying drawings, an embodiment of an image encoding apparatus according to the present invention will be described in details.

Figure 1:
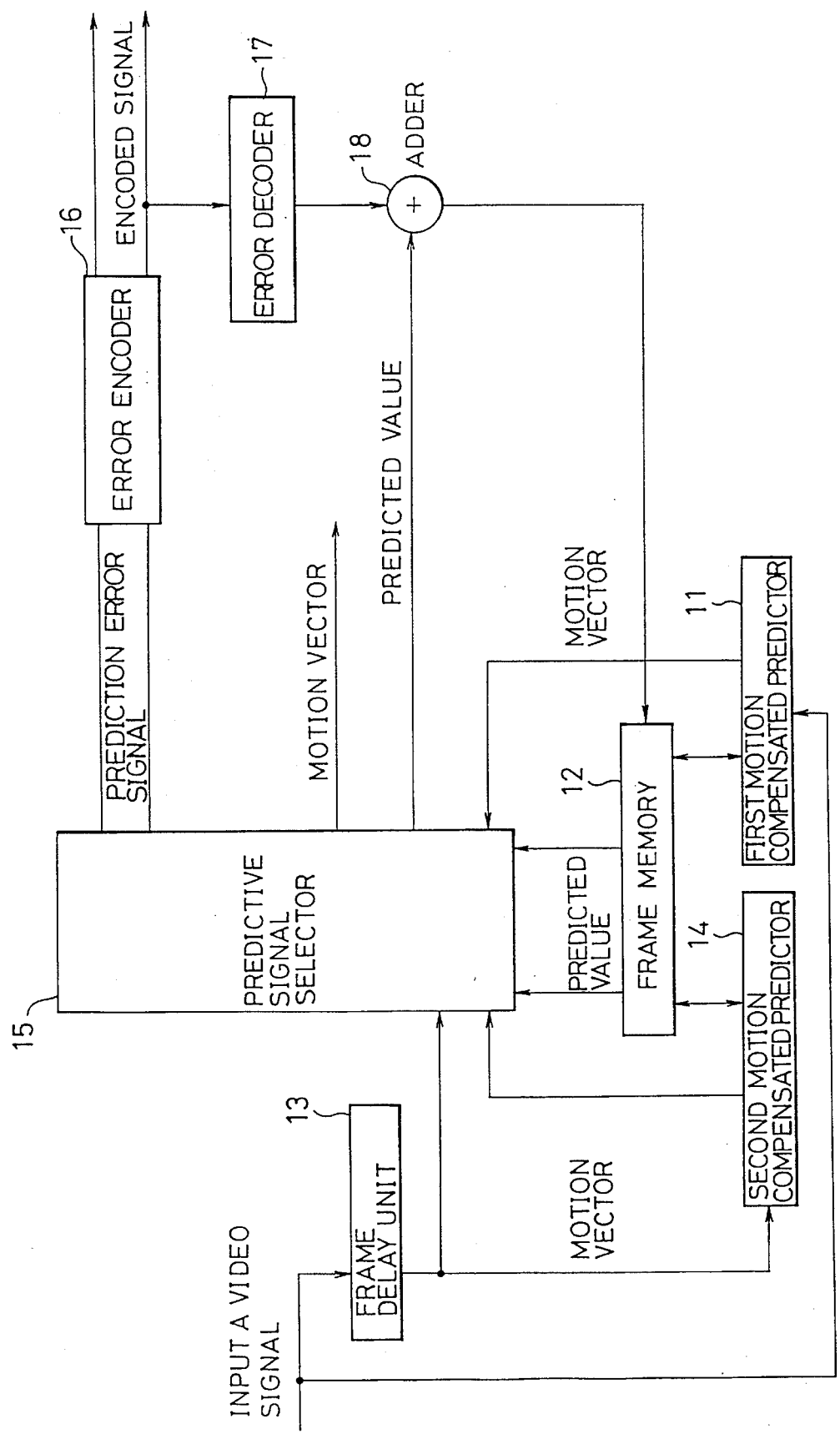
FIG. 1 is a schematic block diagram of an embodiment of an image coder of the present invention.

FIG. 1 shows a construction of the image encoding apparatus according to an embodiment of the present invention.

As shown in FIG. 1, the image encoding apparatus includes a first motion compensated predictor 11 serving as first motion compensated predicting means, a frame memory 12 connected to the first motion compensated predictor 11 and serving as frame memory means, a frame delay unit 13 serving as frame delaying means, a second motion compensated predictor 14 connected to the frame delay unit 13 and serving as second motion compensated predicting means, a prediction signal selector 15 connected to the frame memory 12 and serving as a predicted value selecting means, an error encoder 16 connected to the prediction signal selector 15, an error decoder 17 connected to the error coder 16, and an adder 18 connected to both the prediction signal selector 15 and the error decoder 17.

The first motion compensated predictor 11 performs a motion compensated prediction between an inputted video signal and a video signal stored in the frame memory 12.

The frame delay unit 13 outputs an inputted video signal with a time delay equivalent to an appropriate number of frames.

The second motion compensated predictor 14 performs a motion compensated prediction between a delayed video signal and the video signal stored in the frame memory 12.

The predicted signal selector 15 compares a predicted signal outputted from the first motion compensated predictor 11 and a predicted signal outputted from the second motion compensated predictor 14 for an appropriate selection to output two types of prediction error signals.

The error encoder 16 appropriately encodes the prediction error signals to output encoded signals corresponding to the prediction error signals, respectively.

The error decoder 17 partially decodes one type of encoded signal to output a prediction error decoded signal.

The adder 18 adds a prediction error decoded signal to a predicted value to output a reproduced video signal after encoding. The reproduced video signal is sent to and stored in the frame memory 12.

Figure 2:
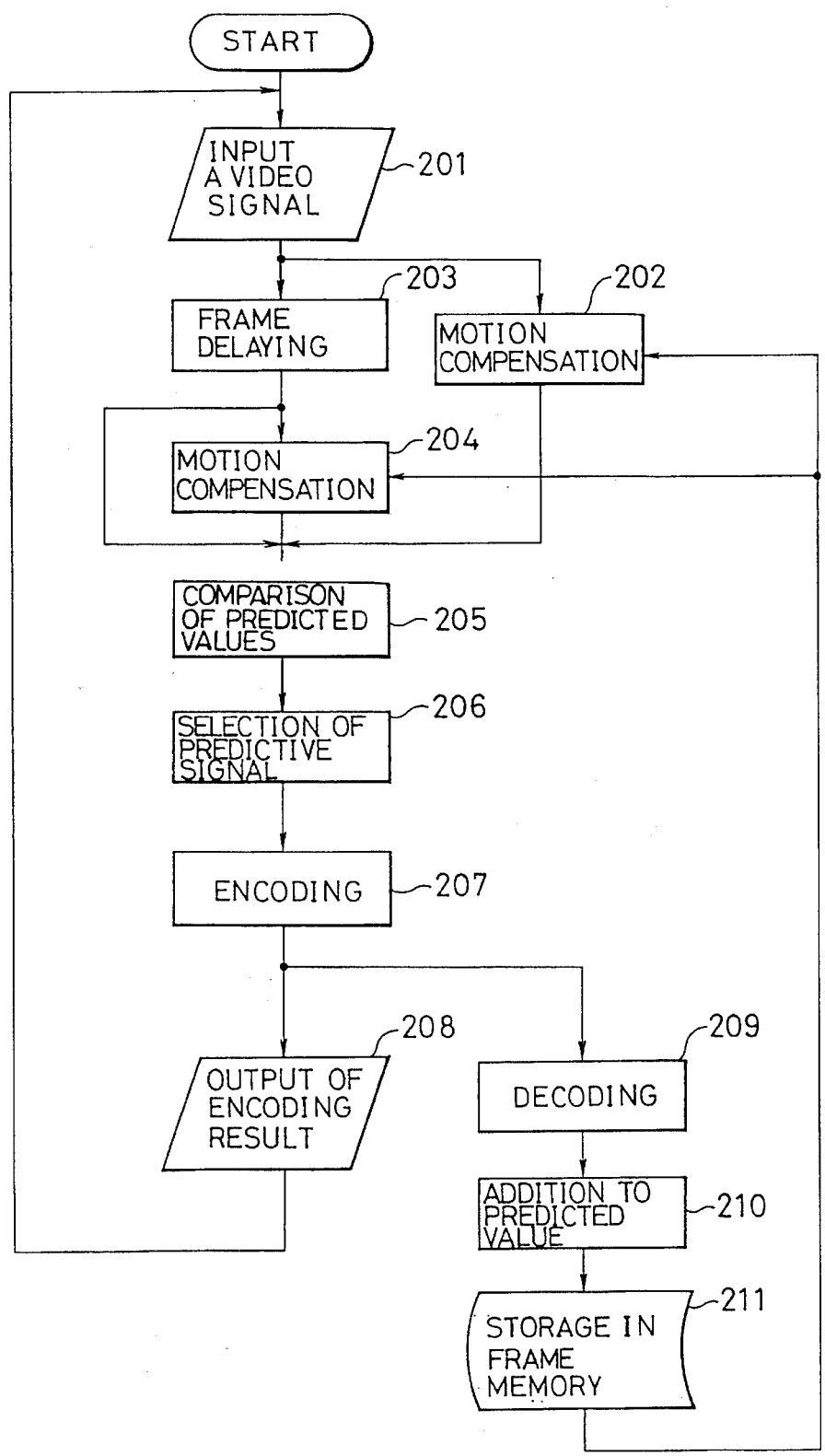
FIG. 2 is a flowchart showing the working of an embodiment of an image coder of the present invention.

Next, an operation of the image encoding apparatus shown in FIG. 1 is described by referring to a flowchart as shown in FIG. 2

The frame delay unit 13 delays an inputted video signal (step 201) with a time equivalent to an appropriate number of frames (step 203). The second motion compensated predictor 14 performs a motion compensated prediction between a delayed video signal and a video signal stored in the frame memory 12 (step 204) to read out an appropriate area, while the first motion compensated predictor 11 parallel performs a motion compensated prediction between an inputted video signal and a video signal stored in the frame memory 12 (step 204) to read out a predicted value in the same way. Both of these predicted values are compared with each other at the predicted signal selector 15 (step 205) to separate the prediction error signals strongly correlated with video frames to be subsequently encoded and those weakly correlated therewith for a selection (step 206). The prediction error signals are appropriately encoded at the error coder 16 e.g. by DCT encoding by means of correlation inside an image frame (step 207) to be outputted to an outside of the device in the form of encoded signals (step 208).

An encoded signal corresponding to the above strongly correlated prediction error signal is decoded at the error decoder 17 (step 209) in a manner contrary to the encoding at the above error encoder 16. A prediction error decoded signal is added at the adder 18 again to a predicted value (step 210) to obtain a reproduced signal after encoding. This reproduced video signal is sent to the frame memory 12 to be stored (step 211) in order to be used as a predicted value for motion compensated prediction of a video frame to be subsequently encoded.

Figure 3:
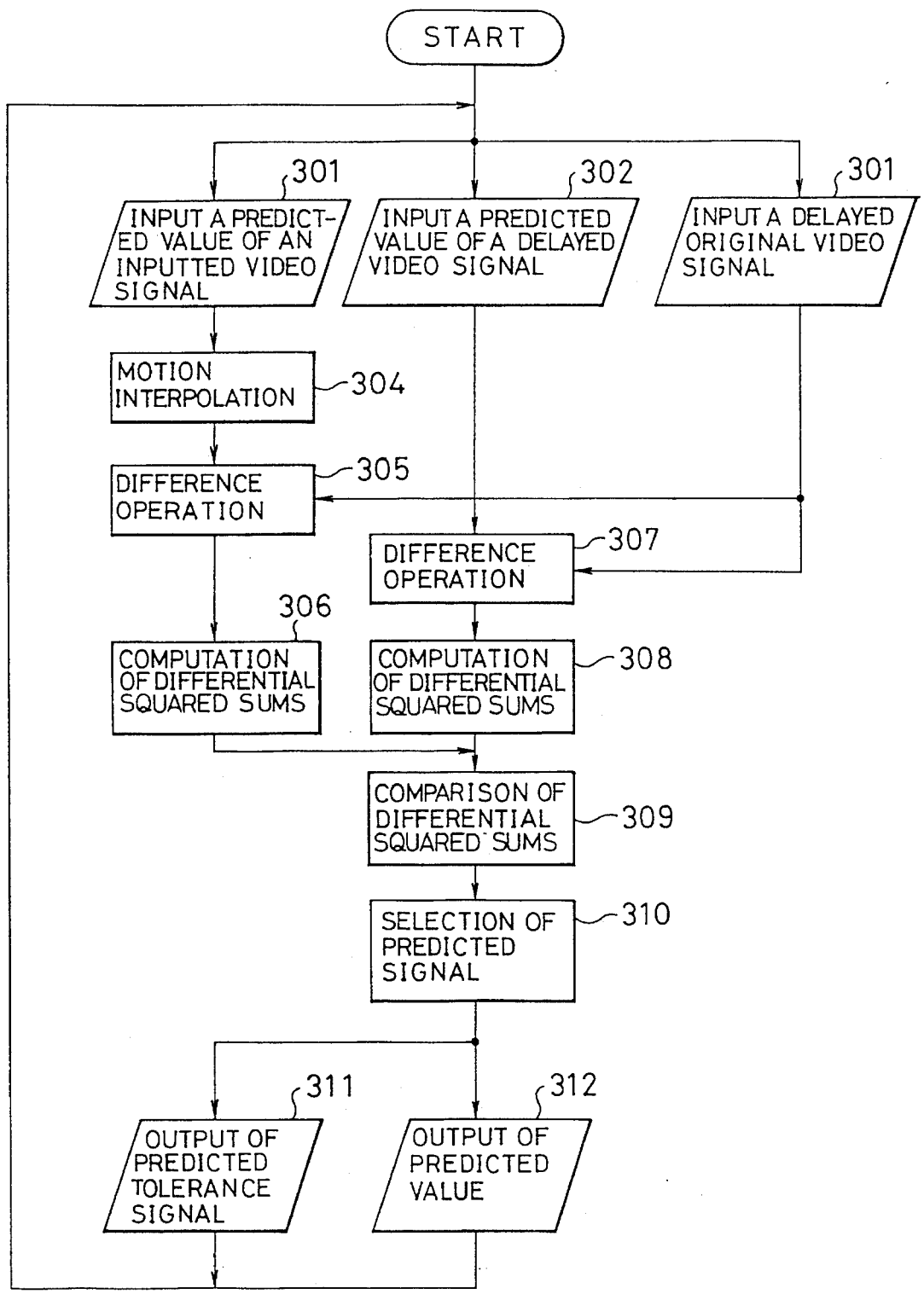
FIG. 3 is a flowchart showing the working of predictive signal selector in an embodiment of an image coder of the present invention.

Next, an operation of the predicted signal selector 15 is described referring to a flowchart shown in FIG. 3. A predicted value of the above inputted video signal and a predicted value of the above inputted and delayed video signal are inputted to the predicted signal selector 15 (steps 901 and 302), while a delayed original video signal is also inputted (step 303).

The delayed video signal is a current video frame to be encoded, in the present invention taking an advantage of a correlation between a video frame to be subsequently encoded and a temporarily prior video frame. Then, an appropriate motion interpolation is effected to a predicted value so as to make time-position adjustment of a predicted value of an inputted video signal (without delay) to a video frame to be encoded (step 304), followed by obtaining the respective differences between both of the above predicted values and the original video signal (steps 305 and 307) to compute the respective differential squared sums (steps 306 and 308).

The above respective differential squared sums are compared (step 309) to select and output the smaller predicted value of the differential squared sums (step 310), while the difference between the selected predicted value and delayed original video signal is outputted as a prediction error signal (step 311), for the purpose of avoiding reduction in encoding efficiency at a current video frame to be encoded and keeping a correlation with the following image frame, since encoding efficiency at a current video frame to be encoded is reduced, if a predicted value, of an inputted video signal, more strongly correlated with an image frame to be subsequently coded than a predicted value of a delayed inputted video signal, is always selected.

FIG. 4 shows the principle of the motion compensated prediction encoding system. In the motion compensated prediction encoding system, an image frame to be encoded and a previously encoded image frame are respectively divided into appropriate rectangular blocks to make comparison at each block. A block well compatible with a block to be encoded is found out of previously coded image frames to detect a motion vector indicating the direction of the position of the compatible block relative to a block in the same position with a block to be coded. Then, the motion vector is used to represent motion information involved in a video signal to represent a predicted value of the block to be encoded by the compatible block in the said image frame.

What is claimed is:

1. An image encoding apparatus which improves efficiency of motion compensation encoding comprising:

a frame memory means for storing a previously decoded and locally decoded video signal;

a first motion compensated prediction means connected to said frame memory for predicting a motion compensation between a first inputted video signal and said video signal stored in said frame memory means;

a delaying means for delaying said first inputted video signal and for outputting said delayed first video signal as a second video signal;

a second motion compensated prediction means connected to said delaying means for predicting a motion compensation between said second inputted video signal and said video signal stored in said frame memory means; and a predicted value selection means connected to both said first motion compensated prediction means and said second motion compensated prediction means for comparing a prediction value outputted from said first motion compensated prediction means with a predicted value outputted from said second motion compensated prediction means and for selecting one of said prediction values in accordance with a compared result.

2. An image encoding apparatus according to claim 1, wherein said predicted value selection means compares said predicted value outputted from said first motion compensated prediction means and said predicted value outputted from said second motion compensated prediction means for an appropriate selection so as to output two types of prediction error signals.

3. An image encoding apparatus according to claim 2, wherein said image encoding apparatus further comprises an error encoding means connected to said predicted value selection means for appropriately encoding said prediction error signals so as to output encoded signals corresponding to said prediction error signals, respectively.

4. An image encoding apparatus according to claim 3, wherein said image encoding apparatus further comprises an error decoding means connected to said error encoding means for locally decoding one type of said encoded signals so as to output a prediction error decoded signal.

5. An image encoding apparatus according to claim 4, wherein said image encoding apparatus further comprises an adding means connected to both said predicted value selection means and said error decoding means for adding said prediction error decoded signal to said predicted value so as to output a reproduced video signal after encoded.

* * * * *